3,024,221
SULFO ESTERS OF α-METHYLENE CARBOXYLIC ACIDS

Walter J. Le Fevre and David P. Sheetz, Midland, Mich., assignors to The Dow Chemical Company, Midland, Mich., a corporation of Delaware
No Drawing. Filed Mar. 25, 1957, Ser. No. 647,974
17 Claims. (Cl. 260—79.3)

This invention pertains to new sulfo esters of α-methylene carboxylic acids and a method for their preparation.

An object of this invention is to provide new polymerizable materials and their polymers.

A more particular object is to provide such materials that are dispersible in water and aqueous compositions, e.g. to form true or colloidal solutions thereof.

A specific object is to provide sulfo esters of α-methylene carboxylic acids, their polymers, and a method for the preparation of such esters and polymers.

Other objects and advantages of the invention will be apparent in the following description.

The objects of this invention have been attained in a class of sulfoesters having the formula $$R''—CO_2—Q—SO_3M$$

wherein the radical R'' is selected from the group consisting of vinyl and α-substituted vinyl, the radical —Q— is a divalent hydrocarbon radical having its valence bonds on different carbon atoms, and M is a cation. Such sulfo esters are equivalent to esters of α-methylene carboxylic acids and hydroxy organic sulfonic acids and are also representable by the formula

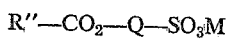

wherein the symbol R' represents hydrogen, a halogen such as chlorine, or an organic radical such as an alkyl radical, the symbol —Q— represents a bivalent organic radical having its valence bonds on two different carbon atoms such as an alkylene radical, and M is a member of the group consisting of hydrogen, ammonium bases, and metals. The term "sulfo ester" of an α-methylene carboxylic acid is used herein to mean an ester corresponding to a carboxylate ester of an α-methylene carboxylic acid and a hydroxy organic compound, which latter compound has, as substituent on a carbon atom thereof, a sulfo group, i.e. a sulfonic acid group ($—SO_3H$) or a salt thereof such as a sodiosulfo ($—SO_3Na$) group.

In instances where —Q— is an aliphatic radical, the sulfo esters are representable by the formula

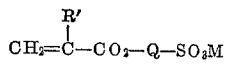

wherein $n$ is an integer, preferably from 2 to 4, including instances where —$C_nH_{2n}$— is a straight chain.

The sulfo esters of α-methylene carboxylic acids of the class just defined are preparable in accordance with this invention by interacting an acyl halide of the class having the formula

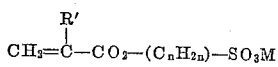

wherein X is a halogen, e.g. chlorine or bromine, with a hydroxy organic sulfonic acid compound having the formula

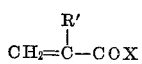

wherein the symbols have the same meanings as given hereinbefore.

Among the α-methylene carboxylic acids are the acrylic-type acids. Among the hydroxy organic sulfonic acid compounds are those in which the symbol —Q— is an aliphatic radical (such as the hydroxy alkanesulfonic acids), those in which —Q— is an aromatic radical (such as the phenolsulfonic acids), and those in which —Q— is a radical in which one valence bond is on an aliphatic carbon atom and the other valence bond is on an aromatic nucleus.

Specific examples of α-methylene carboxylic acyl halides that are suitable starting materials are:

Acryloyl chloride and bromide
Methacryloyl chloride and bromide
α-Ethylacryloyl chloride and bromide
α-Propylacryloyl chloride and bromide
α-Butylacryloyl chloride and bromide
α-Pentylacryloyl chloride and bromide
α-Hexylacryloyl chloride and bromide
Atropoyl chloride and bromide
α-Cyclohexylacryloyl chloride and bromide
α-Furylacryloyl chloride and bromide
α-Chloroacryloyl chloride and bromide Specific examples of hydroxy sulfonic acid compounds that are suitable starting materials are the following hydroxy sulfonic acids (and their salts):

2-hydroxyethanesulfonic acid (isethionic acid)
2-hydroxy-1-propanesulfonic acid
1-hydroxy-2-propanesulfonic acid
2-hydroxy-1-butanesulfonic acid
1-hydroxy-2-butanesulfonic acid
3-hydroxy-2-butanesulfonic acid
1-hydroxy-2-methyl-2-propanesulfonic acid
2-hydroxy-2-methyl-1-propanesulfonic acid
3-bromo-1-hydroxy-2-propanesulfonic acid
3-bromo-2-hydroxy-1-propanesulfonic acid
3-chloro-1-hydroxy-2-propanesulfonic acid
3-chloro-2-hydroxy-1-propanesulfonic acid
1-bromo-2-hydroxy-3-butanesulfonic acid
1-bromo-3-hydroxy-2-butanesulfonic acid
1-chloro-2-hydroxy-3-butanesulfonic acid
1-chloro-3-hydroxy-2-butanesulfonic acid
3-bromo-1-hydroxy-2-butanesulfonic acid
3-bromo-2-hydroxy-1-butanesulfonic acid
3-chloro-1-hydroxy-2-butanesulfonic acid
3-chloro-2-hydroxy-1-butanesulfonic acid
1-chloro-2-hydroxy-2-methyl-3-propanesulfonic acid
1-chloro-3-hydroxy-2-methyl-2-propanesulfonic acid
1-chloro-2-(chloromethyl)-2-hydroxy-3-propanesulfonic acid
1-chloro-2-(chloromethyl)-3-hydroxy-2-propanesulfonic acid
1-hydroxy-2-methoxy-2-propanesulfonic acid
2-hydroxy-3-methoxy-1-propanesulfonic acid
2-hydroxycyclohexanesulfonic acid
2-hydroxy-2-phenylethanesulfonic acid
2-hydroxy-1-phenylethanesulfonic acid
2-bromo-3-hydroxy-2-methyl-3-phenyl-1-propanesulfonic acid
3-hydroxy-1-propanesulfonic acid
3-hydroxy-1-butanesulfonic acid
1-hydroxy-3-butanesulfonic acid
4-hydroxy-1-butanesulfonic acid
Ar-phenolsulfonic acid
Ar-(2-hydroxyethoxy)benzenesulfonic acid Specific examples of sulfo esters of α-methylene carboxylic acids provided by this invention are the following sulfo esters (and salts of the sulfonic acid group):

2-sulfoethyl acrylate
2-sulfoethyl methacrylate
2-sulfoethyl α-ethylacrylate
2-sulfoethyl α-propylacrylate
2-sulfoethyl α-butylacrylate
2-sulfoethyl α-hexylacrylate
2-sulfoethyl α-cyclohexylacrylate 2-sulfoethyl α-chloroacrylate
2-sulfo-1-propyl acrylate
2-sulfo-1-propyl methacrylate
1-sulfo-2-propyl acrylate and methacrylate
2-sulfo-1-butyl acrylate and methacrylate
1-sulfo-2-butyl acrylate and methacrylate
3-sulfo-2-butyl acrylate and methacrylate
2-methyl-2-sulfo-1-propyl acrylate and methacrylate
2-methyl-1-sulfo-2-propyl acrylate and methacrylate
3-bromo-2-sulfo-1-propyl acrylate
3-bromo-1-sulfo-2-propyl acrylate
3-chloro-2-sulfo-1-propyl acrylate
3-chloro-1-sulfo-2-propyl acrylate
1-bromo-3-sulfo-2-butyl acrylate
1-bromo-2-sulfo-3-butyl acrylate
1-chloro-3-sulfo-2-butyl acrylate
1-chloro-2-sulfo-3-butyl acrylate
3-bromo-2-sulfo-1-butyl acrylate
3-bromo-1-sulfo-2-butyl acrylate
3-chloro-2-sulfo-1-butyl acrylate
3-chloro-1-sulfo-2-butyl acrylate
1-chloro-2-methyl-3-sulfo-2-propyl acrylate
1-chloro-2-methyl-2-sulfo-3-propyl acrylate
1-chloro-2-(chloromethyl)-3-sulfo-2-propyl acrylate
1-chloro-2-(chloromethyl)-2-sulfo-3-propyl acrylate
3-methoxy-2-sulfo-1-propyl acrylate
3-methoxy-1-sulfo-2-propyl acrylate
2-sulfocyclohexyl acrylate
2-phenyl-2-sulfoethyl acrylate
1-phenyl-2-sulfoethyl acrylate
3-sulfo-1-propyl acrylate
3-sulfo-1-butyl acrylate
4-sulfo-1-butyl acrylate
Ar-sulfophenyl acrylate
Ar-sulfophenyl methacrylate
2-(ar-sulfophenoxy)ethyl acrylate These sulfo esters are in most instances liquids that are soluble in water and that form salts with ammonium bases, such as ammonia and organic amines, with metal bases such as the alkali metal and alkaline earth metal bases, and with other base-acting reagents. The salts of the sulfo esters are in most instances crystalline solids that are soluble in water and insoluble in most organic liquids.

The preparation of these sulfo esters can be carried out by interacting an acyl halide of an α-methylene carboxylic acid with a salt of a hydroxy sulfonic acid. Suitable salts of the hydroxy sulfonic acid are the alkali metal or alkaline earth metal salts, for example, sodium isethionate or potassium isethionate. Usually, the acyl halide and the hydroxy sulfonic acid salt are charged in proportions corresponding to a small excess of the acyl halide, e.g. from 1.0 to 1.2 mole weights of acyl halide per mole weight of the hydroxy sulfonic acid salt. A trace of a polymerization inhibitor, e.g. a phenol such as hydroquinone or p-methoxyphenol, can be added to the reaction mixture to retard or prevent polymerization of the unsaturated compounds.

In instances where the hydroxy sulfonic acid salt employed as the starting material is one in which the hydroxyl group is attached to an aliphatic carbon atom, e.g. a hydroxyalkanesulfonic acid salt such as sodium isethionate, the reaction thereof with the α-methylene carboxylic acid halide causes evolution of hydrogen halide, e.g. HCl. Such reaction is usually carried out by heating the reaction mixture to initiate the reaction, e.g. to a temperature of 50° C. The reaction is exothermic and is preferably carried out at temperatures in the range from 50° to 200° C. or more. The hydrogen halide reaction product tends to add to the ethylenic linkage in the α-methylene carboxylic acid or ester to form β-chlorocarboxylic acid by-products; for example, in the reaction of acryloyl chloride and sodium isethionate, some 2-sodiosulfoethyl β-chloropropionate is usually found in the 2-sodiosulfoethyl acrylate product. To minimize such by-product formation, the reaction is preferably carried out in a manner such that the hydrogen halide is removed from the reaction mixture as quickly as possible, e.g. by operating at the boiling point of the reaction mixture and by employing a liquid reaction medium that is a poor solvent for the hydrogen halide. Suitable liquids that can be used as reaction media are hydrocarbons, such as toluene and xylene, and chlorohydrocarbons, such as chlorobenzene and dichlorobenzene, such liquids preferably being used in a proportion that facilitates stirring the resulting reaction mixture.

In instances where the hydroxyl group in the starting hydroxy sulfonic acid is attached to an aromatic nucleus, e.g. phenolsulfonic acid, the starting salt is preferably the hydroxyl salt, e.g. NaOC$_6$H$_4$SO$_3$Na. In such instances, the reaction with the starting α-methylene carboxylic acid halide causes formation of a halide salt, e.g. NaCl. Such reactions are preferably carried out in an alkaline aqueous reaction medium, e.g. one having a pH value of 8 or more, and the reaction temperature is preferably maintained at or below room temperature, e.g. in the range from 0° to 25° C., to minimize hydrolysis of the acyl halide or of the ester product.

The reaction product of either of the foregoing embodiments of the process is the sulfo ester in salt form corresponding to the salt of starting material, e.g. the reaction product of acryloyl chloride and sodium isethionate is 2-sodiosulfoethyl acrylate, which is substantially insoluble in inert liquid reaction media such as chlorobenzene. The sulfo ester salt can be collected from the reaction mixture by conventional means such as filtration. The salt forms of the sulfo esters are soluble in water and the lower alcohols, e.g. methanol. The free acid forms of the sulfo esters are readily obtained by contacting a water solution of the salt form of the sulfo ester with a cation exchange resin in its hydrogen (acid) form. From the free acid forms of the sulfo esters, other salt forms are obtained by neutralization with the corresponding base-acting reagent.

In some instances, sulfo esters of the kind with which this invention is concerned are advantageously prepared by interacting an α-methylene carboxylic acid directly with an aliphatic hydroxy sulfonic acid compound of the kind hereinbefore described, optionally by effecting removal of water from the resulting esterification reaction mixture by azeotropic distillation with a suitable co-distillation agent. This improved esterification process for making sulfo esters of α-methylene carboxylic acids is the subject of an application, Serial No. 647,952, filed concurrently herewith by David P. Sheetz.

The following specific examples illustrate certain of these sulfo esters, the preparation thereof, and some of their properties, but are not to be construed as limiting the invention. In the examples, parts and percentages are by weight unless otherwise noted.

*Example 1.—2-Sodiosulfoethyl Acrylate*

Into a reaction vessel fitted with a stirrer, reflux condenser and dropping funnel were charged 200 ml. of o-dichlorobenzene and 74 grams of finely ground sodium isethionate. The mixture was heated to 135° C. with stirring, and 50 grams of acryloyl chloride was added dropwise over a period of 20 minutes with the temperature of the reaction mixture in the range of from 135° to 145° C. The temperature was raised to 176° C. for one hour, after which the reaction mixture was cooled to room temperature and filtered. The white, crystalline filter cake was thoroughly washed with anhydrous isopropanol and dried to obtain 94 grams of a product which was found by analysis to contain 59 percent 2-sodiosulfoethyl acrylate and 32 percent 2-sodiosulfoethyl-β-chloropropionate. The product is soluble in water and hot methanol (from which it can be recrystallized and purified) and is insoluble or only slightly soluble in most other organic liquids.

Example 2.—2-Sulfoethyl Acrylate and Sodium Salt

Into a reaction vesesl fitted with a stirrer and a reflux condenser with provision for withdrawing a portion of the condensate were charged 576 grams of glacial acrylic acid, 569 grams of aqueous 87 percent by weight isethionic acid, and 4 grams of p-methoxyphenol. The mixture was vigorously stirred and heated to 70° C. whereupon the mixture became homogeneous. Eight hundred milliliters of benzene was added and the mixture was vigorously refluxed. The azeotropic distillate separated into two layers, a water layer which was withdrawn from the system, and a benzene layer which was returned to the reaction vessel. The distillation was continued for six hours during which 53 ml. of water was withdrawn. The cooled reaction mixture consisted of a syrupy liquid layer containing 2-sulfoethyl acrylate and a benzene layer that was decanted from the syrup. This syrupy liquid was partially neutralized by addition thereto of 236 grams of sodium carbonate thereby converting the 2-sulfoethyl acrylate to the corresponding sodium salt and forming a pasty slurry. After addition of 80 ml. of water to the slurry, the resulting mixture was heated on steam to form a clear solution which was poured into 4 liters of methyl ethyl ketone forming a slurry which was then cooled to 10° C. The solid was collected by filtration, washed with methyl ethyl ketone and dried to obtain 764 grams of a white crystalline product analyzing 90 percent 2-sodiosulfoethyl acrylate. The product melted at approximately 225° C. with immediately polymerization.

The 2-sodiosulfoethyl acrylate is very soluble in water, soluble in hot methanol, and practically insoluble in non-polar organic liquids.

The product was recrystallized from a methanol-water mixture, dried and analyzed with these results (percent by weight):

|          | Found  | Calculated for 2-sodiosulfoethyl acrylate |
|----------|--------|------------------------------------------|
| Carbon   | 29.43  | 29.7                                     |
| Hydrogen | 3.40   | 3.47                                     |
| Sulfur   | 15.5   | 15.85                                    |

Example 3.—2-Sodiosulfoethyl Methacrylate

Into a reaction flask fitted with a stirrer and reflux condenser were charged 100 ml. of chlorobenzene, 74 grams of finely divided sodium isethionate, and 60 grams of methacryloyl chloride. The reaction mixture was stirred vigorously and heated under reflux for one hour. The resulting reaction mixture was cooled to room temperature, diluted with 500 ml. of acetone, and was filtered to obtain a filter cake which was washed with acetone and dried to yield 100 grams of white, crystalline product containing 73 percent by weight of 2-sulfoethyl methacrylate, sodium salt, and some 2-sodiosulfoethyl β-chloroisobutyrate.

Example 4.—Sodiosulfopropyl Acrylate

Into a reaction flask fitted with a stirrer and reflux condenser were charged 400 ml. of n-heptane, 162 grams of the sodium salt of hydroxypropanesulfonic acid (a mixture of the sodium salts of 2-hydroxy-1-propanesulfonic acid and 1-hydroxy-2-propanesulfonic acid), 100 grams of acryloyl chloride, and 2 grams of hydroquinone. The resulting mixture was stirred and heated at 80° C. for 0.5 hour and at reflux (95° C.) for an additional two hours. The resulting reaction mixture was cooled to room temperature, the liquid layer was decanted from the waxy solid. The latter was triturated with diethyl ether yielding a crystalline solid. The crystalline solid was collected by filtration, washed with ether, and dried to yield 202 grams of a mixture containing 1-sodiosulfo-2-propyl acrylate and 2-sodiosulfo-1-propyl acrylate, together with some of the corresponding sodiosulfopropyl β-chloropropionates.

Example 5.—Sulfopropyl Acrylate and Sodium Salt

Into a reaction vessel fitted with a stirrer and reflux condenser with provision for withdrawing a portion of the condensate were charged 576 grams of acrylic acid, 604 grams of aqueous hydroxypropanesulfonic acid (containing 8 percent by weight of water and 92 percent by weight of a mixture of 1-hydroxy-2-propanesulfonic acid and 2-hydroxy-1-propanesulfonic acid), and 4 grams of p-methoxyphenol. The mixture was heated with stirring to 70° C., 800 mls. of benzene was added, and the resulting mixture was heated to reflux distillation. The azeotropic distillate separated into a water layer, which was withdrawn from the system, and a benzene layer, which was returned to the reaction mixture. The distillation was continued until 79 ml. of water had been withdrawn. After the reaction mixture had been cooled to room temperature, it was partially neutralized by slowly adding 240 grams of solid sodium carbonate, and the mixture was heated on steam until all of the carbonate had dissolved, thereby forming the sodium salt of the sulfopropyl acrylate ester. Two liters of toluene was added and the mixture was vigorously stirred, then allowed to stand. A toluene layer was decanted from a heavy liquid layer and the latter was stirred with three liters of methyl ethyl ketone and allowed to stand. After the resulting mixture had been cooled to 0° C., it was filtered to obtain a white crystalline solid product which was washed with acetone and dried to yield 754 grams of a mixture of the sodium salts of 1-sulfo-2-propyl acrylate and 2-sulfo-1-propyl acrylate assaying 99 percent sodiosulfopropyl acrylate by saponification.

The elemental analyses, in percent by weight, were as follows:

|          | Found  | Calculated for sodiosulfopropyl acrylate |
|----------|--------|------------------------------------------|
| Carbon   | 32.87  | 33.3                                     |
| Hydrogen | 4.25   | 4.17                                     |
| Sulfur   | 14.37  | 14.8                                     |

Example 6.—2-Sulfoethyl Methacrylate and Sodium Salt

In a reaction vessel fitted with a stirrer and reflux condenser with provision for withdrawing a portion of the condensate, a mixture of 672 grams of methacrylic acid, 566 grams of aqueous isethionic acid (containing 11 percent by weight water and 89 percent by weight isethionic acid), and 4 grams of p-methoxyphenol was heated at 80° C. for 0.5 hour. After 800 ml. of benzene was added, the resulting mixture was heated at reflux distillation. The azeotropic distillate separated into two layers, the water layer being withdrawn from the system and the benzene layer being returned to the reaction mixture. The distillation was continued for approximately five hours until 85 ml. of water had been removed. After the reaction mixture had been cooled to room temperature, it was partially neutralized by slowly adding 230 grams of sodium carbonate. After 80 mls. of water had been added, the resulting mixture was heated on steam until the carbonate dissolved, thereby forming the sodium salt of the 2-sulfoethyl methacrylate ester, whereupon the mixture was poured into two liters of acetone. Two liters of methyl ethyl ketone was added, and the resulting slurry was cooled to approximately 0° C. and was filtered. The white, crystalline product was dried to obtain 719 grams of the sodium salt of 2-sulfoethyl methacrylate having an assay value (by saponification) of 92 percent by weight. The product melted at approximately 245° C. with immediate polymerization.

The 2-sodiosulfoethyl methacrylate was a white, crystalline solid that was very soluble in water, soluble in hot methanol, and insoluble in non-polar organic liquids.

After recrystallization from a methanol-water mixture, the salt was analyzed with the following results in percent by weight.

|  | Found | Calculated for 2-sodiosulfoethyl methacrylate |
|---|---|---|
| Carbon | 33.3 | 33.3 |
| Hydrogen | 4.15 | 4.16 |
| Sulfur | 14.5 | 14.8 |

Example 7.—p-Sodiosulfophenyl Methacrylate

Into a mixture of 109 grams of the disodium salt of p-phenolsulfonic acid, 225 ml. of water, and 1 gram of sodium nitrite (polymerization inhibitor), at a temperature of 5° C., was added with stirring 57.5 grams of methacryloyl chloride during a period of one hour while the temperature of the reaction mixture was maintained below 10° C. and the pH value of the mixture was maintained at 10 by the occasional addition of sodium hydroxide solution as needed. Stirring was continued for an additional 15 minutes, after which hydrochloric acid was added to the reaction mixture until the pH value thereof was 7. The resulting slurry was heated on steam until the precipitate dissolved, after which the resulting solution was cooled to give a filterable, crystalline solid precipitate. The crystalline solid was collected on a filter and was recrystallized from a 90 percent methanol-10 percent water solvent to provide 72 grams of p-sodiosulfophenyl methacrylate, assaying 100 percent by saponification. The elemental analyses were as follows, percent by weight:

|  | Found | Calculated for p-sodiosulfophenyl methacrylate |
|---|---|---|
| Carbon | 45.68 | 45.45 |
| Hydrogen | 3.36 | 3.41 |
| Sulfur | 11.84 | 12.12 |

Example 8.—p-Sodiosulfophenyl Acrylate

Into a mixture of 109 grams of the disodium salt of p-phenolsulfonic acid, 300 ml. of water, and 1 gram of sodium nitrite (polymerization inhibitor), at a temperature of 5° C., was added, dropwise and with stirring, 49.8 grams of acryloyl chloride during a period of one hour while the temperature of the reaction mixture was maintained below 10° C. and the pH value of the mixture was maintained at 10 by the occasional addition thereto of sodium hydroxide solution as needed. Stirring was continued for an additional 15 minutes, after which hydrochloric acid was added to the reaction mixture until the pH value thereof was 7. The reaction mixture was heated on steam for 30 minutes, after which the solution was filtered, and the filtrate was cooled in an ice-salt mixture. The resulting solid crystals were collected on a filter and dried to provide 77 grams of p-sodiosulfophenyl acrylate assaying 100 percent by saponification. The elemental analyses, in percent by weight, were as follows:

|  | Found | Calculated for p-sodio-sulfo-ethyl acrylate |
|---|---|---|
| Carbon | 43.01 | 43.20 |
| Hydrogen | 2.90 | 2.80 |
| Sulfur | 12.84 | 12.80 |

The monomeric sulfo esters of α-methylene carboxylic acids are readily polymerized. Homopolymers are prepared by polymerizing individual monomeric sulfoesters, and copolymers are obtained by polymerizing mixtures of two or more of such monomeric esters. The polymerization can be carried out in mass, i.e. in the absence of diluents, in solution, or in dispersion in non-solvent liquid media. The polymerization is accelerated by heat, by activation with ionizing radiations, and by catalysis with free-radical catalysts such as peroxygen compounds, e.g. sodium or potassium persulfate and cumene hydroperoxide, and α,α′-azobisisobutyronitrile.

The following specific examples illustrate the polymerization of certain of these sulfo esters but are not to be construed as limiting the invention.

Example 9.—Homopolymeric 2-Sodiosulfoethyl Acrylate

A solution of 50 grams of recrystallized 2-sodiosulfoethyl acrylate and 0.05 gram of potassium persulfate in 100 ml. of water was closed in a container under an atmosphere of nitrogen and agitated for one hour in a water bath at a temperature of 70° C. There was thereby obtained a viscous solution. Addition of methanol to the viscous aqueous solution precipitated a sticky mass which was collected and dried to a hard, brittle, white, solid resinous polymer of 2-sodiosulfoethyl acrylate. This polymer was very hydroscopic, soluble in water but insoluble or only slightly soluble in most organic liquids. Its water solutions are viscous and such solutions, when dried as a thin layer on a supporting surface, form clear films.

Example 10.—Homopolymeric 2-Sodiosulfoethyl Methacrylate

A mixture consisting essentially of 20 ml. of water, 10 grams of 2-sodiosulfoethyl methacrylate, 0.001 gram of $(NH_4)_2S_2O_8$, 0.001 gram of $K_2SO_3 \cdot 2H_2O$ was allowed to stand at room temperature for 24 hours forming a clear stiff gel of homopolymeric 2-sodiosulfoethyl methacrylate. Dilution of the gel with water produced a viscous solution.

Example 11.—Homopolymeric p-Sodiosulfophenyl Acrylate

A solution of 5 grams of p-sodiosulfophenyl acrylate, 25 ml. of water, and 0.0025 gram of potassium persulfate was heated on steam for 30 minutes to obtain a very viscous solution of homopolymeric p-sodiosulfophenyl acrylate.

Example 12.—Homopolymeric p-Sodiosulfophenyl Methacrylate

A solution of 5 grams of p-sodiosulfophenyl methacrylate, 25 ml. of water, and 0.0025 gram of potassium persulfate was heated on steam for 30 minutes to obtain a very viscous solution of homopolymeric p-sodiosulfophenyl methacrylate.

The polymeric forms of the products of this invention are used as, and in the preparation of soil conditioners, stabilizers for aqueous colloidal dispersions and emulsions (such as polymer "latexes"), surface-active agents, antistatic finishes for textiles and plastics, adhesives, sizes for textiles and paper, and dye assistants. The monomeric forms of the products of this invention are used in similar ways and are particularly advantageous in being polymerizable during or after preparation of the desired composition or combination of ingredients.

The following specific examples illustrate ways in which these sulfo esters are used.

Example 13

A homopolymer of 2-sodiosulfoethyl acrylate was tested as an agent for improving the condition of agricultural soils. In this test, Miami silt loam soil, known to be subject to severe compaction and puddling in the field, was air-dried and sieved through a 10-mesh screen. A solution was prepared by dissolving 0.15-gram of homopolymeric 2-sodiosulfoethyl acrylate in 30 milliliters of water. The resulting solution was mixed with stirring with 300 grams of the dry, sieved soil to provide a soil composition containing 0.05 percent by weight of the homopolymeric 2-sodiosulfoethyl acrylate.

The treated portion of soil was placed in a standard soil tube having a 1.875-inch inside diameter, and was gently tamped to obtain a soil column of 6 inches depth. The column so prepared was wetted with water to saturation and allowed to stand for 72 hours. Thereafter, a constant head of water was maintained over the soil column for 24 hours, and the rate of percolation of water through the soil column was determined. An untreated portion of the sieved Miami soil was wetted with water, placed in a soil tube, and subjected to the same percolation procedure as just described to serve as a control. The rates of percolation, in milliliters per hour, of water through these soil samples are shown in the table below.

Upon completion of the percolation determination just described, the soil samples were allowed to drain for 16 hours and were removed from the tubes. A 200-gram portion of each of the wet soil samples was placed on a standard 14-mesh sieve (Tyler sieve series) superimposed on a 32-mesh sieve. The sieve combination was then agitated for a period of about two minutes in a tank of water until all of the fine, non-aggregated soil was screened out. By this procedure, water-stable aggregates having diameters of 0.5 millimeter or greater were retained on the screens. These stable aggregates were allowed to drain for five minutes and were weighed. The amount of such stable aggregates, as percent by weight of the wet soil, are also shown in the table.

TABLE

| Soil sample | Percolation rate, ml/hr. | Stable Aggregates, weight percent |
|---|---|---|
| Blank, control | 90 | 18.5 |
| 2-sodiosulfoethyl acrylate, homopolymer | 886 | 28.5 |

In agricultural practice, the polymeric sulfo ester, such as the 2-sodiosulfoethylacrylate homopolymer, is distributed over the surface of freshly fitted soil, normally subject to puddling and formation of hard crusts, and admixed with the upper layer of soil to a depth of three inches or thereabouts, e.g. by use of a disk and drag. Marked improvement of the soil texture and tilth results throughout the subsequent growing season.

*Example 14*

The use of sulfo esters of α-methylene carboxylic acids as thickening agents was demonstrated by adding 1 gram of a 10 percent aqueous solution of homopolymeric 2-sodiosulfoethyl acrylate (equivalent to 0.1 gram of the polymer) to 200 grams of a commercial aqueous latex containing approximately 48 percent of a copolymer of 60 percent styrene and 40 percent 1,3-butadiene colloidally dispersed therein. The homopolymeric 2-sodiosulfoethyl acrylate was one which, as a 0.5 percent solution in water containing 2 percent sodium chloride, had a viscosity at 25° C. of 4.63 centipoises. The starting styrene-butadiene copolymer latex had a Brookfield viscosity value (No. 4 spindle, 12 r.p.m.) at 25° C. of 35 centipoises. The viscosity value (Brookfield, No. 4 spindle, 25 r.p.m.) at 25° C. of the latex thickened with the homopolymeric 2-sodiosulfoethyl acrylate was 85 centipoises.

We claim:
1. A composition of matter having the formula

$$R''-CO_2-Q-SO_3M$$

wherein the radical R'' is selected from the group consisting of vinyl and α-substituted vinyl, the radical —Q— is a divalent hydrocarbon radical having its valence bonds on different carbon atoms, and M is a cation.

2. A homopolymer of a polymerizable sulfo ester as claimed in claim 1.

3. An addition polymer consisting essentially of at least two polymerizable sulfo esters as claimed in claim 1.

4. An addition polymer according to claim 3 wherein one of the polymerizable sulfo esters has the formula $$CH_2=CH-CO_2-CH_2CH_2-SO_3M$$

5. An addition polymer according to claim 3 wherein one of the polymerizable sulfo esters has the formula $$CH_2=\overset{CH_3}{\underset{|}{C}}-CO_2-CH_2CH_2-SO_3M$$

6. A polymerizable sulfo ester according to claim 1 wherein —Q— is the radical —$C_nH_{2n}$— and $n$ is an integer of 2 to 4.

7. A sulfopropyl acrylate.

8. A polymerizable sulfo ester having the formula $$CH_2=CH-CO_2-CH_2CH_2-SO_3M$$

wherein M is a cation.

9. A homopolymer of the sulfo ester according to claim 8.

10. A polymerizable sulfo ester having the formula $$CH_2=\overset{CH_3}{\underset{|}{C}}-CO_2-CH_2CH_2-SO_3M$$

wherein M is a cation.

11. A homopolymer of the sulfo ester according to claim 10.

12. A polymerizable sulfo ester according to claim 1 wherein —Q— is a phenylene radical.

13. A homopolymer of the sulfo ester according to claim 12.

14. A method of making a sulfo ester having the formula $$R''-CO_2-Q-SO_3M$$

which comprises interacting an acyl halide having the formula $$R''-COX$$

with a salt of a hydroxy sulfonic acid having the formula $$HO-Q-SO_3H$$

by heating a mixture thereof while dispersed in an inert liquid medium, the radical R'' being selected from the group consisting of vinyl and α-substituted vinyl, the radical —Q— being a divalent hydrocarbon radical having its valence bonds on different carbon atoms, M being a salt-forming cation, and X being a halogen with atomic number of 17 to 35, both inclusive.

15. A method of making a sulfo ester according to claim 14 wherein —Q— is a radical —$C_nH_{2n}$— and the salt of the hydroxy sulfonic acid is a salt of an aliphatic hydroxy sulfonic acid having the formula $$HO-C_nH_{2n}-SO_3M$$

$n$ being an integer of 2 to 4, the heating being continued until evolution of hydrogen chloride is substantially complete.

16. A method of making a sulfo ester according to claim 14 wherein —Q— is a phenylene radical and the salt of the hydroxy sulfonic acid is a phenoxide salt of a phenolsulfonic acid and the reaction is carried out while the reactants are dispersed in an alkaline aqueous reaction medium at temperatures in the range from 0° to 25° C.

17. A composition of matter having the formula:

$$\left[ \underset{CH_3}{\underset{|}{CH_2=CCOO(C_nH_{2n})SO_3}} \right]_x R$$

in which $n$ is an integer of 3 to 4, $x$ is an integer of 1 to 2, and R is a member of the class consisting of alkali metals and alkaline earth metals, said ($C_nH_{2n}$) group being a straight chain.

References Cited in the file of this patent
UNITED STATES PATENTS

| | | |
|---|---|---|
| 1,881,172 | Daimler et al. | Oct. 4, 1932 |
| 2,812,267 | Garner | Nov. 5, 1957 |
| 2,923,734 | Sheetz | Feb. 2, 1960 |